United States Patent
Morris et al.

(10) Patent No.: US 10,350,523 B2
(45) Date of Patent: Jul. 16, 2019

(54) FILTER HOUSING

(71) Applicant: Caterpillar Inc., Peoria, IL (US)

(72) Inventors: Bryant Alan Morris, Dunlap, IL (US);
Jeffrey R Ries, Metamora, IL (US);
Brian John Sutton, Edwards, IL (US)

(73) Assignee: Caterpillar Inc., Deerfield, IL (US)

( * ) Notice: Subject to any disclaimer, the term of this patent is extended or adjusted under 35 U.S.C. 154(b) by 193 days.

(21) Appl. No.: 15/450,449

(22) Filed: Mar. 6, 2017

(65) Prior Publication Data
US 2018/0250617 A1 Sep. 6, 2018

(51) Int. Cl.
*B01D 35/30* (2006.01)
*B01D 36/00* (2006.01)
(Continued)

(52) U.S. Cl.
CPC ............ *B01D 35/30* (2013.01); *B01D 29/33* (2013.01); *B01D 36/003* (2013.01); *B01D 36/006* (2013.01); *B01D 46/0004* (2013.01); *B01D 46/0005* (2013.01); *B01D 46/2411* (2013.01); *F01M 11/03* (2013.01); *F01P 11/06* (2013.01); *F02M 35/0201* (2013.01); *F02M 37/22* (2013.01); *F16N 39/06* (2013.01); *F01P 2011/061* (2013.01)

(58) Field of Classification Search
CPC ...... B01D 35/30; B01D 35/005; B01D 29/31; B01D 36/003; B01D 36/006; B01D 46/0002; B01D 46/0005; B01D 2201/30; F02M 37/22; F02M 37/221; F02M 35/0201; F01M 11/03; F01P 11/06; F01P 2011/061; F16N 39/06
See application file for complete search history.

(56) References Cited

U.S. PATENT DOCUMENTS

| 4,539,109 A | 9/1985 | Davis |
| 4,652,367 A * | 3/1987 | Reulecke .............. B01D 29/05 210/448 |

(Continued)

FOREIGN PATENT DOCUMENTS

| DE | 102013018199 | 4/2015 |
| DE | 102015014600 | 5/2016 |

OTHER PUBLICATIONS https://www.mann-hummel.com/cs/mf-cz/news/newsdetail/?tx_ttnews%5Btt_news%5D=497&cHash=425bc4a49089f92b53de4b7cfbd0b89f, "3-Stage Filter Removes Particles and Water From Diesel Fuel", Mann Filter, Last Viewed on Nov. 22, 2016.

*Primary Examiner* — Robert Clemente

(57) ABSTRACT

A filter housing is provided. The filter housing includes a circumferential rib provided on an outer surface thereof. The filter housing also includes a first longitudinal rib provided on the outer surface thereof. The first longitudinal rib connects and extends away from the circumferential rib along a length of the filter housing. The first longitudinal rib defines a first thickness thereof. The first thickness tapers towards the circumferential rib. The filter housing further includes a second longitudinal rib provided on the outer surface thereof. The second longitudinal rib is provided opposing the first longitudinal rib. The second longitudinal rib connects and extends away from the circumferential rib along the length of the filter housing. The second longitudinal rib defines a second thickness thereof. The second thickness tapers towards the circumferential rib.

17 Claims, 5 Drawing Sheets

(51) Int. Cl.
*B01D 46/00* (2006.01)
*F02M 37/22* (2019.01)
*F02M 35/02* (2006.01)
*F01M 11/03* (2006.01)
*F01P 11/06* (2006.01)
*B01D 46/24* (2006.01)
*B01D 29/33* (2006.01)
*F16N 39/06* (2006.01)

(56) References Cited

U.S. PATENT DOCUMENTS

| | | | |
|---|---|---|---|
| 8,057,669 B2 | 11/2011 | Beard et al. | |
| 2005/0178706 A1* | 8/2005 | Bagci | B01D 29/21 210/130 |
| 2007/0095744 A1* | 5/2007 | Bagci | B01D 29/21 210/435 |
| 2007/0193936 A1* | 8/2007 | Almasian | B01D 35/30 210/232 |
| 2008/0245719 A1* | 10/2008 | Beard | B01D 29/114 210/235 |
| 2011/0094386 A1 | 4/2011 | Peng | |
| 2012/0031821 A1* | 2/2012 | Swain | B01D 35/147 210/87 |
| 2012/0080372 A1* | 4/2012 | Ries | B01D 36/006 210/440 |
| 2017/0296949 A1* | 10/2017 | Krull | B01D 21/265 |

* cited by examiner

FILTER HOUSING

TECHNICAL FIELD

The present disclosure relates to a filter housing. More particularly, the present disclosure relates to the filter housing associated with a filter assembly for an engine.

BACKGROUND

Generally, a diesel powered internal combustion engine employs a number of fluid filters, such as a fuel water separator. The fuel water separator may include two enclosures, viz., a bowl for receiving drained water and a housing for enclosing a filter element of the fuel water separator. The bowl and the housing may be coupled to one another by any mechanical coupling method, such as bonding, welding, and so on.

For a reusable type of the fuel water separator, the fuel water separator may have to be serviced at regular intervals. During servicing, the housing and/or the bowl may have to be disassembled from the engine in order to access the filter element therein. In such a situation, a gripping tool, such as a strap wrench, may be used to grip the housing and/or the bowl in order to securely hold the fuel water separator.

Often times, a clamping force exerted by the gripping tool may result in flexing of the housing and/or the bowl in turn leading to structural damage thereof. As a result, the housing and/or the bowl may have to be replaced leading to increased service and operating costs. Hence, there is a need for an improved filter housing for such a fluid filter.

U.S. Pat. No. 8,057,669 describes a fluid filtering apparatus and method having keyed components to ensure that a correct filter element is being installed into a filter base. Keyed arrangements may occur between the filter element and a filter housing, the filter element and the filter base, and the filter base and the filter housing. A locking arrangement may be provided to prevent undesired loosening of the filter element relative to the filter base. The filter base may include a torsion lock insert that engages lock detents of the filter element to prevent the undesired loosening. An adaptor may be provided to provide the lock detents that interact with the torsion lock insert.

SUMMARY OF THE DISCLOSURE

In an aspect of the present disclosure, a filter housing is provided. The filter housing includes at least one circumferential rib provided on an outer surface thereof. The filter housing also includes at least one first longitudinal rib provided on the outer surface thereof. The at least one first longitudinal rib connects and extends away from the at least one circumferential rib along a length of the filter housing. The at least one first longitudinal rib defines a first thickness thereof. The first thickness tapers towards the at least one circumferential rib. The filter housing further includes at least one second longitudinal rib provided on the outer surface thereof. The at least one second longitudinal rib is provided opposing the at least one first longitudinal rib. The at least one second longitudinal rib connects and extends away from the at least one circumferential rib along the length of the filter housing. The at least one second longitudinal rib defines a second thickness thereof. The second thickness tapers towards the at least one circumferential rib.

In another aspect of the present disclosure, a filter housing is provided. The filter housing includes at least one circumferential rib provided on an outer surface thereof. The filter housing also includes at least one first sloping element provided on the outer surface thereof. The at least one first sloping element connects and extends away from the at least one circumferential rib along a length of the filter housing. The at least one first sloping element defines a first slope thereof. The first slope tapers towards the at least one circumferential rib. The filter housing further includes at least one second sloping element provided on the outer surface thereof. The at least one second sloping element is provided opposing the at least one first sloping element. The at least one second sloping element connects and extends away from the at least one circumferential rib along the length of the filter housing. The at least one second sloping element defines a second slope thereof. The second slope tapers towards the at least one circumferential rib.

In yet another aspect of the present disclosure, a filter housing is provided. The filter housing includes a circumferential rib provided on an outer surface thereof. The filter housing also includes a first longitudinal rib provided on the outer surface thereof. The first longitudinal rib connects and extends away from the circumferential rib along a length of the filter housing. The first longitudinal rib defines a first thickness thereof. The first thickness tapers towards the circumferential rib. The filter housing further includes a second longitudinal rib provided on the outer surface thereof. The second longitudinal rib is provided opposing the first longitudinal rib. The second longitudinal rib connects and extends away from the circumferential rib along the length of the filter housing. The second longitudinal rib defines a second thickness thereof. The second thickness tapers towards the circumferential rib. Each of the first longitudinal rib and the second longitudinal rib is adapted to contact and urge a gripping tool towards the circumferential rib. The filter housing also includes a drain port fluidly coupled to the filter housing.

Other features and aspects of this disclosure will be apparent from the following description and the accompanying drawings.

DETAILED DESCRIPTION

Figure 1:
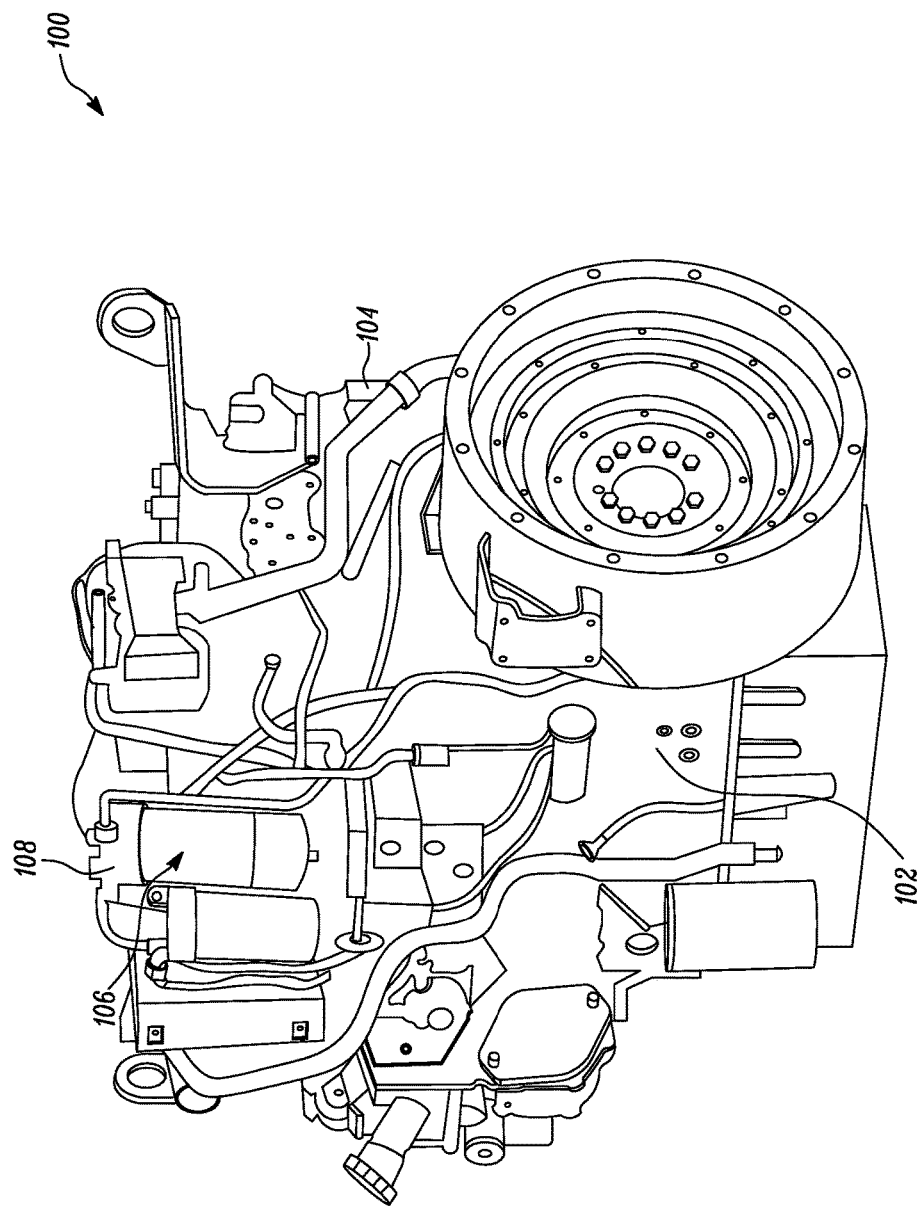
FIG. 1 is a perspective view of an exemplary engine, according to one embodiment of the present disclosure.

Wherever possible, the same reference numbers will be used throughout the drawings to refer to the same or the like parts. Referring to FIG. 1, an exemplary engine 100 is illustrated. The engine 100 is an internal combustion engine powered by diesel fuel. In other embodiments, the engine 100 may be powered by any other fuel such as, natural gas, gasoline, and/or a combination thereof. In one embodiment, the engine 100 may be employed by a machine (not shown). It should be recognized that the concepts of the present disclosure may be suitably applicable to any type and configuration of the engine 100. The engine 100 and/or the machine may be used for applications including, but not limited to, power generation, transportation, construction, agriculture, forestry, aviation, marine, material handling, and waste management.

The engine 100 includes an engine block 102. The engine block 102 includes one or more cylinders (not shown) provided therein. The cylinders may be arranged in any configuration such as inline, radial, and "V". The engine 100 further includes a piston (not shown) movably disposed within each of the cylinders. Each of the pistons may be coupled to a crankshaft (not shown) of the engine 100. Energy generated from combustion of the fuel inside the cylinders may be converted to rotational energy of the crankshaft by the pistons.

The engine 100 may also include a cylinder head 104 mounted on the engine block 102. The cylinder head 104 may house one or more components and/or systems (not shown) of the engine 100 such as a valve train, an intake manifold, an exhaust manifold, sensors, and so on. Additionally, the engine 100 may include various other components and/or systems (not shown) such as a crankcase, a fuel system, a lubrication system, an air system, a cooling system, a turbocharger, an exhaust gas recirculation system, an exhaust gas aftertreatment system, and other peripheries.

Further, the engine 100 includes a filter assembly 106 mounted thereon. The filter assembly 106 is adapted for filtration of a fluid such as the diesel fuel associated with the engine 100. In the illustrated embodiment, the filter assembly 106 is mounted on a front housing of the engine 100. In other embodiments, the filter assembly 106 may be mounted on any other section of the engine 100 including, but not limited to, the engine block 102 and the cylinder head 104, without limiting the scope of the disclosure. In yet other embodiments, the filter assembly 106 may be mounted on any section of the machine including, but not limited to, a frame and an enclosure, without limiting the scope of the disclosure. The filter assembly 106 will now be explained in more detail with reference to FIGS. 2 to 5.

Figure 2:
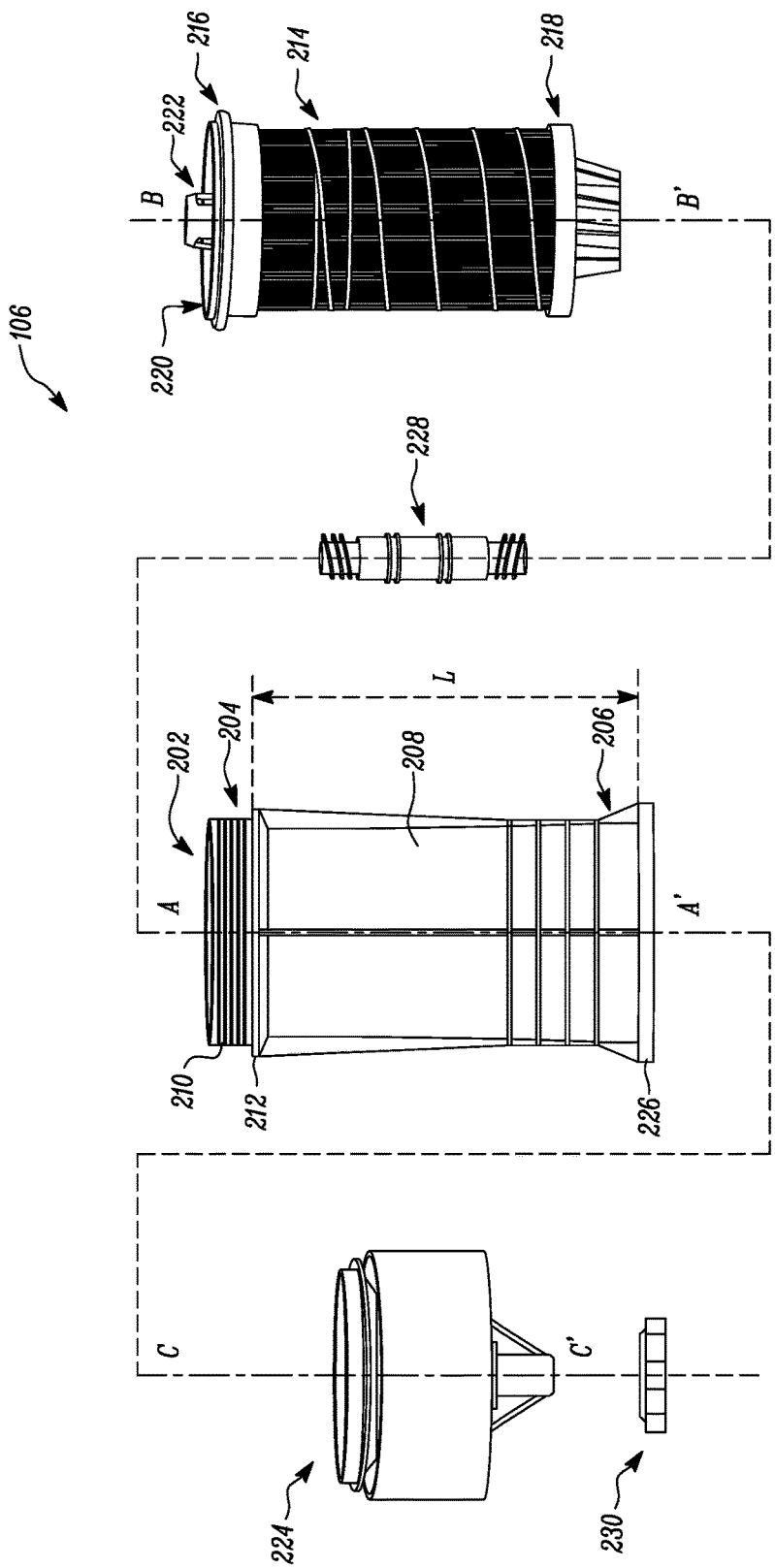
FIG. 2 is an exploded view of a filter assembly of the engine of FIG. 1, according to one embodiment of the present disclosure.

Referring to FIG. 2, an exploded view of the filter assembly 106 is illustrated. In the illustrated embodiment, the filter assembly 106 is a fuel water separator unit. The filter assembly 106 may be any fuel water separator unit known in the art adapted for separation of water content from diesel fuel. In other embodiments, the filter assembly 106 may be any other filter unit associated with the engine 100 and/or the machine, such as an oil filter, a coolant filter, an air filter, a water filter, a fuel filter, and so on without limiting the scope of the disclosure.

The filter assembly 106 includes a first housing 202. The first housing 202 will be hereinafter interchangeably referred to as the "housing 202". The housing 202 includes a hollow and cylindrical configuration defining an axis A-A' thereof. In other embodiments, the housing 202 may include any other configuration, such as a rectangular configuration, an elliptical configuration, and so on without limiting the scope of the disclosure. The housing 202 includes a first end 204 and a second end 206. The second end 206 is distal with respect to the first end 204.

The housing 202 also includes an outer surface 208 extending between the first end 204 and the second end 206 defining a length "L" thereof. In the illustrated embodiment, the first end 204 includes threads 210 and a first collar 212 provided on the outer surface 208. The threads 210 and the first collar 212 are adapted to removably mount the first end 204 of the housing 202 to a base 108 (shown in FIG. 1). The base 108 is adapted to removably receive the housing 202 thereon and provide fluid communication to the filter assembly 106. In other embodiments, the first end 204 of the housing 202 may be coupled to the base 108 using any other fastening method, such as bolting, clamping, bonding, and so on.

The filter assembly 106 includes a filter element 214. The filter element 214 includes a cylindrical configuration defining an axis B-B' thereof. In other embodiments, the filter element 214 may include any other configuration, such as a rectangular configuration, an elliptical configuration, and so on without limiting the scope of the disclosure. The filter element 214 includes a first end 216 and a second end 218. The second end 218 is distal with respect to the first end 216. The filter element 214 is adapted to be received within the housing 202 in a manner such that the first end 216 of the filter element 214 is disposed adjacent to the first end 204 of the housing 202, and the second end 218 of the filter element 214 is disposed adjacent to the second end 206 of the housing 202. Accordingly, in an assembled position, the axis A-A' of the housing 202 may be aligned with respect to the axis B-B' of the filter element 214.

The first end 216 of the filter element 214 includes one or more inlet ports 220. The inlet ports 220 are provided in fluid communication with the base 108. Accordingly, the inlet ports 220 are adapted to receive diesel fuel within the filter element 214 through the base 108. The first end 216 of the filter element 214 also includes one or more outlet ports 222. The outlet ports 222 are also provided in fluid communication with the base 108. Accordingly, the outlet ports 222 are adapted to provide a flow of filtered diesel fuel from the filter element 214 to the base 108 therethrough.

The filter assembly 106 also includes a second housing 224. The second housing 224 will be hereinafter interchangeably referred to as "the bowl 224". The bowl 224 includes a hollow and cylindrical configuration defining an axis C-C' thereof. The bowl 224 is adapted to be coupled to the second end 206 of the housing 202 through a second collar 226 provided thereon in a manner such that the axis C-C' is aligned with respect to the axis A-A' of the housing 202. In the illustrated embodiment, the bowl 224 is fixedly coupled to the housing 202 by welding or bonding. In other embodiments, the bowl 224 may be removably coupled to the housing 202 using any other fastening method, such as bolting, thread coupling, clamping, and so on.

The bowl 224 is adapted to hold the filter element 214 within the housing 202 and restrict movement of the filter element 214 through the second end 206 of the housing 202. The bowl 224 is provided in fluid communication with the housing 202 and the filter element 214. Accordingly, the bowl 224 is adapted to receive water filtered out from diesel fuel, from the filter element 214 and the housing 202. The filter assembly 106 also includes a drain valve 228 adapted to be coupled to the bowl 224. The drain valve 228 is adapted to selectively drain the water received within the bowl 224. The drain valve 228 may be any valve known in the art adapted to control a flow of a fluid. The filter assembly 106 further includes an end piece 230 provided in association with the bowl 224. The end piece 230 is adapted to be coupled to the drain valve 228. Accordingly, in the assembled position, the end piece 230 restricts movement of the drain valve 228 through the bowl 224.

Figure 3:
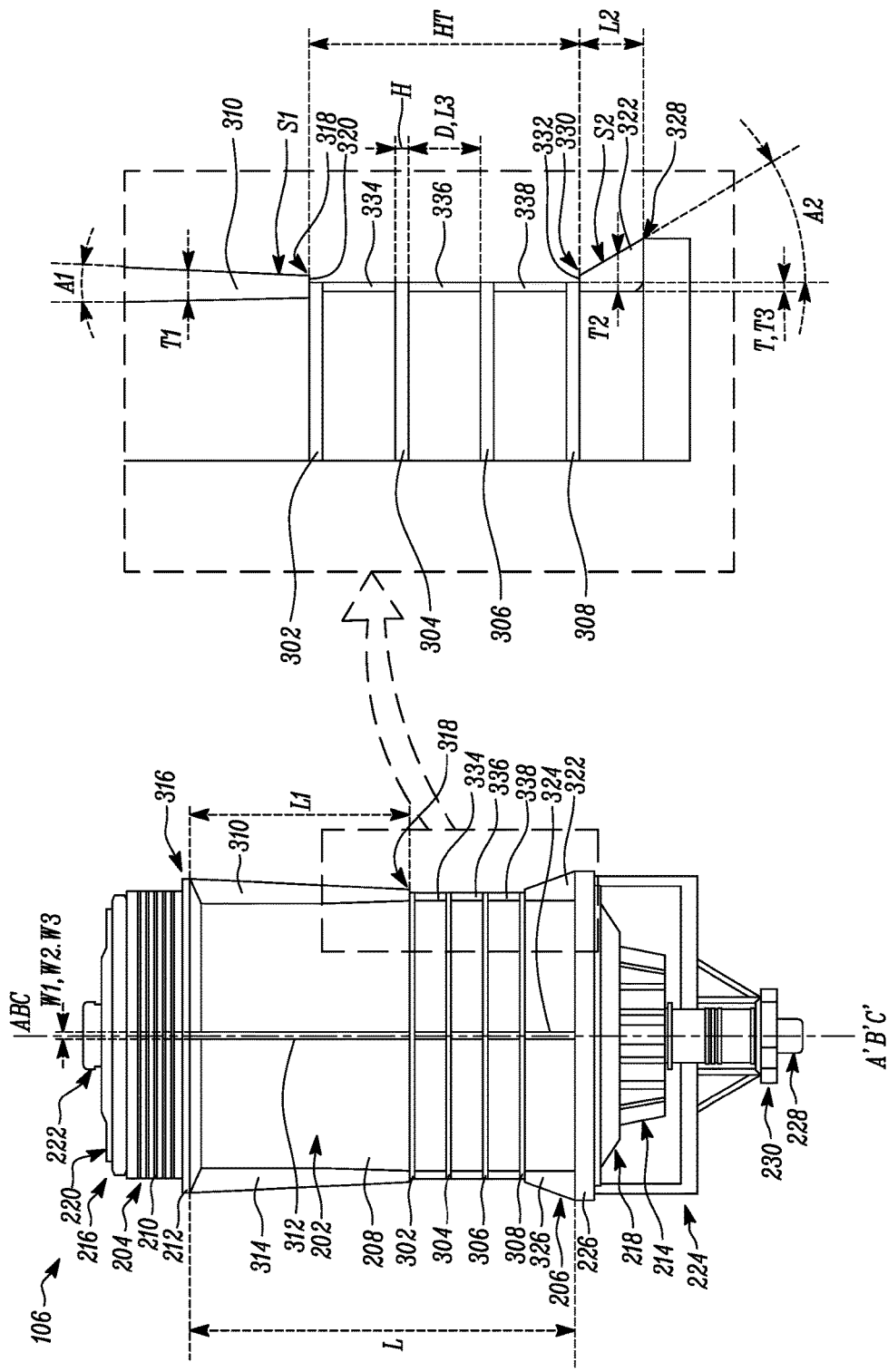
FIG. 3 is a front view of the filter assembly of FIG. 2, according to one embodiment of the present disclosure.
Figure 4:
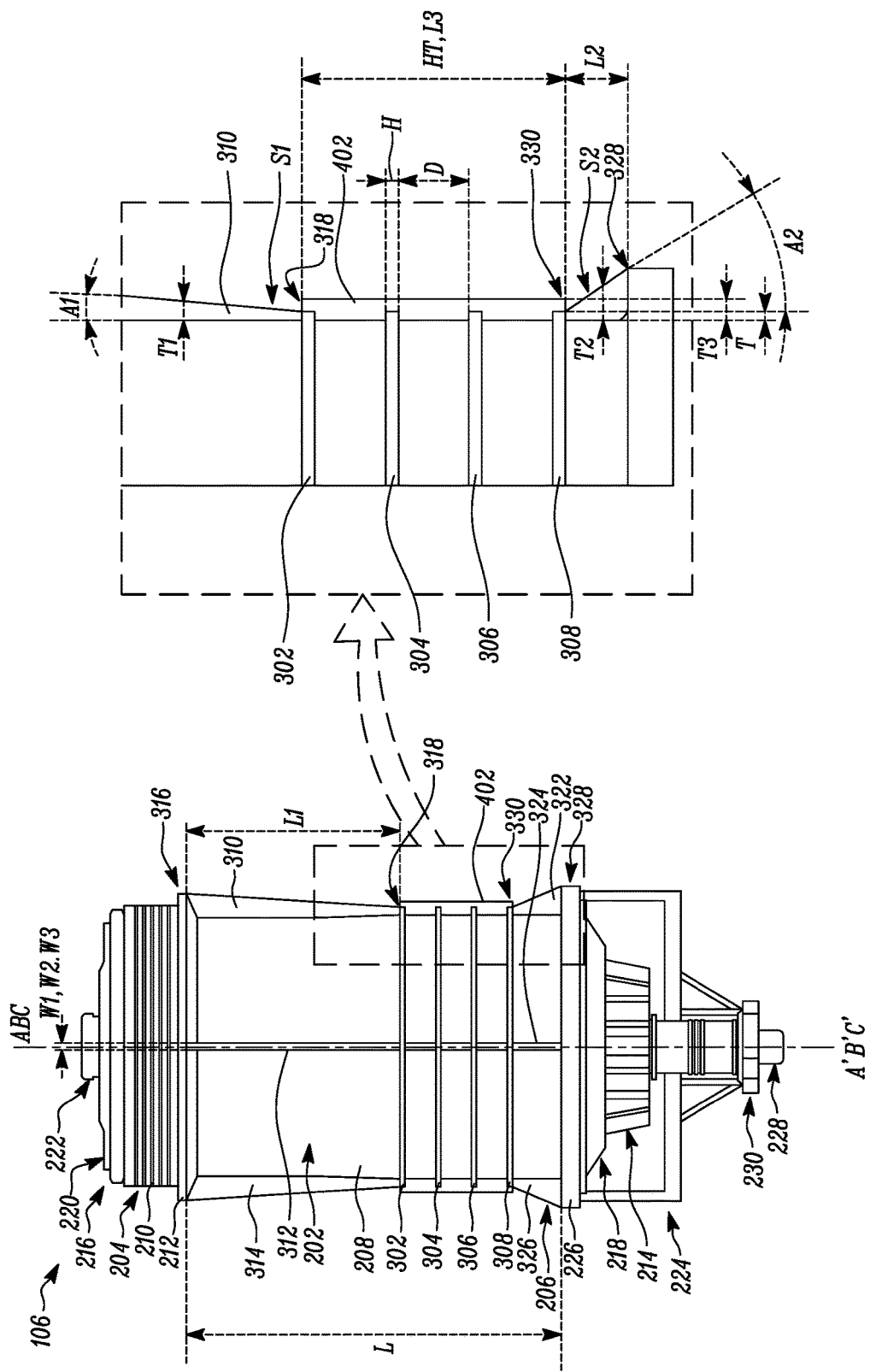
FIG. 4 is a front view of the filter assembly of FIG. 2, according to another embodiment of the present disclosure.
Figure 5:
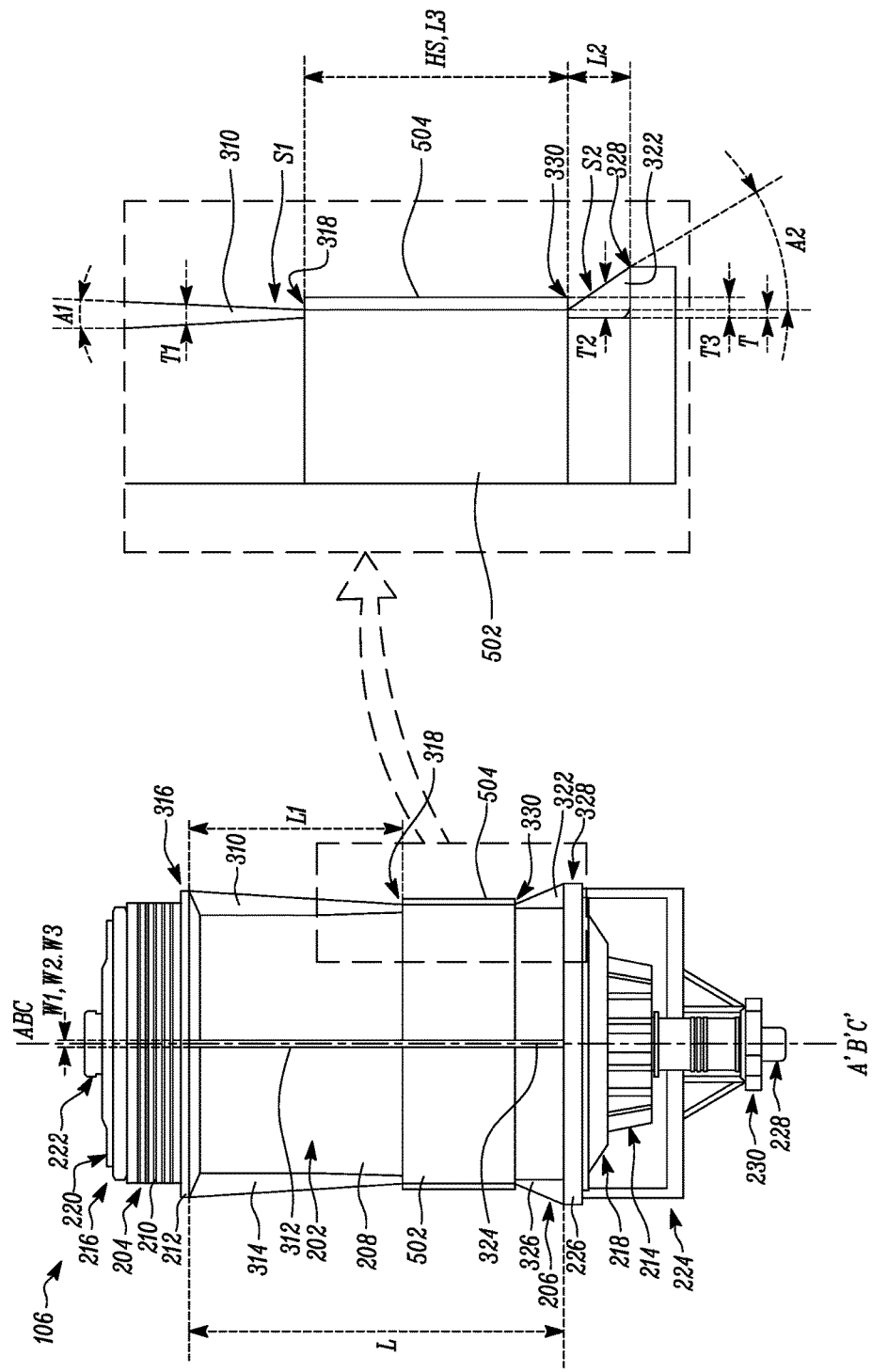
FIG. 5 is a front view of the filter assembly of FIG. 2, according to yet another embodiment of the present disclosure.

The housing 202 will now be explained in more detail with reference to FIGS. 3, 4, and 5. Referring to FIGS. 3, 4 and 5, the housing 202 includes at least one circumferential rib provided on the outer surface 208 thereof. More specifically, in the illustrated embodiments (shown in FIGS. 3 and 4), the housing 202 includes a plurality of circumferential ribs 302, 304, 306, 308 provided on the outer surface 208. Each of the plurality of circumferential ribs 302, 304, 306, 308 is disposed longitudinally spaced apart from one another. In the illustrated embodiments, each of the plurality of circumferential ribs 302, 304, 306, 308 is disposed longitudinally spaced apart at a distance "D" from one another.

In other embodiments, the distance "D" between one or more of the plurality of circumferential ribs 302, 304, 306, 308 may vary with respect to one another. Accordingly, in such a situation, the spacing between one or more of the plurality of circumferential ribs 302, 304, 306, 308 may vary with respect to one another. Each of the plurality of circumferential ribs 302, 304, 306, 308 defines a thickness "T" thereof. In the illustrated embodiments, the thickness "T" of each of the plurality of circumferential ribs 302, 304, 306, 308 is equal to one another. In other embodiments, the thickness "T" of one or more of the plurality of circumferential ribs 302, 304, 306, 308 may vary with respect to one another.

Also, each of the plurality of circumferential ribs 302, 304, 306, 308 defines a height "H" thereof. In the illustrated embodiments, the height "H" of each of the plurality of circumferential ribs 302, 304, 306, 308 is equal to one another. In other embodiments, the height "H" of one or more of the plurality of circumferential ribs 302, 304, 306, 308 may vary with respect to one another. Accordingly, a total height "HT" of the plurality of circumferential ribs 302, 304, 306, 308 equals to a sum of the height "H" of each of the plurality of circumferential ribs 302, 304, 306, 308 and the distance "D" between each of the plurality of circumferential ribs 302, 304, 306, 308.

Further, in some embodiments (shown in FIG. 5), the housing 202 may include a single circumferential rib 502 provided on the outer surface 208. The single circumferential rib 502 defines a height "HS" thereof. The height "HS" may be substantially greater than the height "H" of each of the plurality of circumferential ribs 302, 304, 306, 308. In such a situation, the height "HS" of the single circumferential rib 502 may be equal to the total height "HT" of the plurality of circumferential ribs 302, 304, 306, 308.

Referring to FIGS. 3, 4, and 5, the housing 202 also includes at least one first sloping member, such as at least one first longitudinal rib provided on the outer surface 208 thereof. More specifically, in the illustrated embodiments, the housing 202 includes a plurality of first longitudinal ribs 310, 312, 314 provided on the outer surface 208 thereof. Each of the plurality of first longitudinal ribs 310, 312, 314 is disposed radially spaced apart with respect to one another. Each of the plurality of first longitudinal ribs 310, 312, 314 is disposed on the first end 204 of the housing 202 contacting and extending from the circumferential rib 302 towards the first collar 212 along the length "L". In the illustrated embodiments, each of the plurality of first longitudinal ribs 310, 312, 314 is disposed perpendicular with respect to the first collar 212 and the circumferential rib 302. In other embodiments, one or more of the plurality of first longitudinal ribs 310, 312, 314 may be disposed at an angle with respect to the first collar 212 and/or the circumferential rib 302.

Each of the plurality of first longitudinal ribs 310, 312, 314 includes an elongated configuration defining a first length "L1", a first width "W1", and a first thickness "T1" thereof. In the illustrated embodiments, each of the plurality of first longitudinal ribs 310, 312, 314 includes a constant first width "W1" along the first length "L1" thereof. In other embodiments, one or more of the plurality of first longitudinal ribs 310, 312, 314 may include a varying first width "W1" along the first length "L1" thereof, such as a tapering first width "W1" along the first length "L1" from the first collar 212 towards the circumferential rib 302 or vice versa.

Each of the plurality of first longitudinal ribs 310, 312, 314 includes a tapered configuration such that the first thickness "T1" varies along the first length "L1" between the first collar 212 and the circumferential rib 302. More specifically, the first thickness "T1" tapers in a manner such that the first thickness "T1" is highest at an intersection 316 of each of the plurality of first longitudinal ribs 310, 312, 314 and the first collar 212, and is lowest at an intersection 318 of each of the plurality of first longitudinal ribs 310, 312, 314 and the circumferential rib 302.

In the illustrated embodiment (shown in FIG. 3), the first thickness "T1" at the intersection 318 is higher than the thickness "T" of the circumferential rib 302. Accordingly, the intersection 318 defines a stepped surface 320 therein. In other embodiments (shown in FIGS. 4 and 5), the first thickness "T1" at the intersection 318 is approximately equal to the thickness "T" of the circumferential rib 302. In such a situation, the intersection 318 provides a gradual transition between each of the plurality of first longitudinal ribs 310, 312, 314 and the circumferential rib 302. Also, as shown in FIGS. 3, 4, and 5, the tapering first thickness "T1" defines a first slope "S1" of each of the plurality of first longitudinal ribs 310, 312, 314. The first slope "S1" tapers towards the circumferential rib 302. The first slope "S1" defines a first angle "A1" with respect to the axis A-A' of the housing 202.

Referring to FIGS. 3, 4, and 5, the housing 202 also includes at least one second sloping member, such as at least one second longitudinal rib provided on the outer surface 208 thereof. More specifically, in the illustrated embodiments, the housing 202 includes a plurality of second longitudinal ribs 322, 324, 326 provided on the outer surface 208 thereof. Each of the plurality of second longitudinal ribs 322, 324, 326 is disposed radially spaced apart with respect to one another. In the illustrated embodiments, each of the plurality of second longitudinal ribs 322, 324, 326 is disposed opposing each of the plurality of plurality of first longitudinal ribs 310, 312, 314 respectively. In other embodiments, one or more of the plurality of second longitudinal ribs 322, 324, 326 may be disposed at an offset with respect to one or more of the plurality of first longitudinal ribs 310, 312, 314.

Each of the plurality of second longitudinal ribs 322, 324, 326 is provided contacting and extending from the circumferential rib 308 towards the second collar 226 along the length "L". In the illustrated embodiments, each of the plurality of second longitudinal ribs 322, 324, 326 is disposed perpendicular with respect to the second collar 226 and the circumferential rib 308. In other embodiments, one or more of the plurality of second longitudinal ribs 322, 324, 326 may be disposed at an angle with respect to the second collar 226 and/or the circumferential rib 308.

Each of the plurality of second longitudinal ribs 322, 324, 326 includes an elongated configuration defining a second length "L2", a second width "W2", and a second thickness "T2" thereof. In the illustrated embodiments, the second length "L2" is different with respect to the first length "L1" of each of the plurality of first longitudinal ribs 310, 312, 314. More specifically, the second length "L2" is smaller with respect to the first length "L1" of each of the plurality of first longitudinal ribs 310, 312, 314. Accordingly, the plurality of circumferential ribs 302, 304, 306, 308 is disposed proximate to the second end 206 with respect to the first end 204 of the housing 202. In other embodiments, the second length "L2" may be equal or greater with respect to the first length "L1" of each of the plurality of first longitudinal ribs 310, 312, 314. Accordingly, the plurality of circumferential ribs 302, 304, 306, 308 may be disposed at the center of the housing 202 or proximate to the first end 204 with respect to the second end 206 of the housing 202 respectively.

In the illustrated embodiments, each of the plurality of second longitudinal ribs 322, 324, 326 includes a constant second width "W2" along the second length "L2" thereof. In other embodiments, one or more of the plurality of second longitudinal ribs 322, 324, 326 may include a varying second width "W2" along the second length "L2" thereof, such as a tapering second width "W2" along the second length "L2" from the second collar 226 towards the circumferential rib 308 or vice versa.

Each of the plurality of second longitudinal ribs 322, 324, 326 includes a tapered configuration such that the second thickness "T2" varies along the second length "L2" between the second collar 226 and the circumferential rib 308. More specifically, the second thickness "T2" tapers in a manner such that the second thickness "T2" is highest at an intersection 328 of each of the plurality of second longitudinal ribs 322, 324, 326 and the second collar 226, and is lowest at an intersection 330 of each of the plurality of second longitudinal ribs 322, 324, 326 and the circumferential rib 308.

In the illustrated embodiment (shown in FIG. 3), the second thickness "T2" at the intersection 330 is higher than the thickness "T" of the circumferential rib 308. Accordingly, the intersection 330 defines a stepped surface 332 therein. In other embodiments (shown in FIGS. 4 and 5), the second thickness "T2" at the intersection 330 is approximately equal to the thickness "T" of the circumferential rib 308. In such a situation, the intersection 330 provides a gradual transition between each of the plurality of second longitudinal ribs 322, 324, 326 and the circumferential rib 308. Also, as shown in FIGS. 3, 4, and 5, the tapering second thickness "T2" defines a second slope "S2" of each of the plurality of second longitudinal ribs 322, 324, 326. The second slope "S2" tapers towards the circumferential rib 308. The second slope "S2" defines a second angle "A2" with respect to the axis A-A' of the housing 202.

In the illustrated embodiments, the second slope "S2" is different with respect to the first slope "S1" of each of the plurality of first longitudinal ribs 310, 312, 314. More specifically, the second slope "S2" is greater with respect to the first slope "S1" of each of the plurality of first longitudinal ribs 310, 312, 314. In other embodiments, the second slope "S2" may be approximately equal or lower with respect to the first slope "S1" of each of the plurality of first longitudinal ribs 310, 312, 314 based on application requirements.

Further, referring to FIGS. 3, 4, and 5, the housing 202 includes one or more auxiliary ribs provided on the outer surface 208 thereof. In the illustrated embodiment (shown in FIG. 3), the housing 202 includes a plurality of auxiliary ribs 334, 336, 338 provided on the outer surface 208 thereof. Each of the plurality of auxiliary ribs 334, 336, 338 is disposed contacting and extending between each of the plurality of circumferential ribs 302, 304, 306, 308 respectively. In the illustrated embodiments, each of the plurality of auxiliary ribs 334, 336, 338 is disposed perpendicular with respect to each of the plurality of circumferential ribs 302, 304, 306, 308.

In other embodiments, one or more of the plurality of auxiliary ribs 334, 336, 338 may be disposed at an angle with respect to one or more of the plurality of circumferential ribs 302, 304, 306, 308. Also, each of the plurality of auxiliary ribs 334, 336, 338 is linearly aligned with respect to one another, each of the plurality of first longitudinal ribs 310, 312, 314, and each of the plurality of second longitudinal ribs 322, 324, 326. In other embodiments, one or more of the plurality of auxiliary ribs 334, 336, 338 may be linearly offset with respect to one another, one or more of the plurality of first longitudinal ribs 310, 312, 314, and/or one or more of the plurality of second longitudinal ribs 322, 324, 326.

Each of the plurality of auxiliary ribs 334, 336, 338 includes an elongated configuration defining a third length "L3", a third width "W3", and a third thickness "T3" thereof. In the illustrated embodiments, the third length "L3" is equal to the distance "D" between each of the plurality of circumferential ribs 302, 304, 306, 308. In other embodiments, the third length "L3" may be lesser with respect to the distance "D" between one or more of the plurality of circumferential ribs 302, 304, 306, 308.

In the illustrated embodiments, the third width "W3" of each of the plurality of auxiliary ribs 334, 336, 338 is equal to the first width "W1" and the second width "W2" of each of the plurality of first longitudinal ribs 310, 312, 314 and each of the plurality of second longitudinal ribs 322, 324, 326 respectively. In other embodiments, the third width "W3" of each of the plurality of auxiliary ribs 334, 336, 338 may be different with respect to the first width "W1" and/or the second width "W2" of one or more of the plurality of first longitudinal ribs 310, 312, 314 and/or one or more of the plurality of second longitudinal ribs 322, 324, 326 respectively.

In the illustrated embodiment, the third thickness "T3" of each of the plurality of auxiliary ribs 334, 336, 338 is equal with respect to one another and the thickness "T" of each of the plurality of circumferential ribs 302, 304, 306, 308. In other embodiments, the third thickness "T3" of each of the plurality of auxiliary ribs 334, 336, 338 may vary with respect to one another and/or the thickness "T" of one or more of the plurality of circumferential ribs 302, 304, 306, 308.

For example, as shown in FIG. 4, the housing 202 includes a single auxiliary rib 402 provided on the outer surface 208 thereof. More specifically, the single auxiliary rib 402 is disposed contacting and extending between each of the plurality of circumferential ribs 302, 304, 306, 308. In such a situation, the single auxiliary rib 402 includes a stepped configuration corresponding to a configuration of the plurality of circumferential ribs 302, 304, 306, 308 and the spacing between each of the plurality of circumferential ribs 302, 304, 306, 308. Also, the third thickness "T3" of the single auxiliary rib 402 is higher with respect to the thickness "T" of each of the plurality of circumferential ribs 302, 304, 306, 308.

In another example, as shown in FIG. 5, the housing 202 includes the single auxiliary rib 504 provided on the outer surface 208 thereof. More specifically, the single auxiliary rib 504 is disposed contacting and extending along the height "HS" of the single circumferential rib 502. Also, the third thickness "T3" of the single auxiliary rib 504 may be equal, higher, or lower with respect to the thickness "T" of the single circumferential rib 502.

INDUSTRIAL APPLICABILITY

The present disclosure relates to the one or more circumferential ribs 302, 304, 306, 308, 502, the one or more first longitudinal ribs 310, 312, 314, the one or more second longitudinal ribs 322, 324, 326, and the one or more auxiliary ribs 334, 336, 338, 402, 504 provided on the housing 202. It should be noted that, in other embodiments, the one or more circumferential ribs 302, 304, 306, 308, 502, the one or more first longitudinal ribs 310, 312, 314, the one or more second longitudinal ribs 322, 324, 326, and/or the one or more auxiliary ribs 334, 336, 338, 402, 504 may be alternatively or additional provided on the second housing 224/bowl 224 based on application requirements and without limiting the scope of the disclosure. Further, the configuration of the one or more circumferential ribs 302, 304, 306, 308, 502, the one or more first longitudinal ribs 310, 312, 314, the one or more second longitudinal ribs 322, 324, 326, and/or the one or more auxiliary ribs 334, 336, 338, 402, 504 described herein is merely exemplary and may vary or may be interchanged based on application requirements without limiting the scope of the disclosure.

The circumferential ribs 302, 304, 306, 308, 502, the first longitudinal ribs 310, 312, 314, the second longitudinal ribs 322, 324, 326, and the auxiliary ribs 334, 336, 338, 402, 504 may provide rigidity to the housing 202. More specifically, when a gripping tool, such as a strap wrench, may be used to grip the housing 202 during servicing, the circumferential ribs 302, 304, 306, 308, 502, the first longitudinal ribs 310, 312, 314, the second longitudinal ribs 322, 324, 326, and/or the auxiliary ribs 334, 336, 338, 402, 504 may provide added strength to limit flexing of the housing 202, in turn limiting structural damage to the housing 202. Also, the circumferential ribs 302, 304, 306, 308, 502, the first longitudinal ribs 310, 312, 314, the second longitudinal ribs 322, 324, 326, and/or the auxiliary ribs 334, 336, 338, 402, 504 may provide added sacrificial surface to compensate for surface damage of the housing 202 caused by the gripping tool.

Also, during clamping of the gripping tool around the housing 202, the tapered configuration of the first longitudinal ribs 310, 312, 314 and the second longitudinal ribs 322, 324, 326 may contact and urge the gripping tool away from the first end 204 and/or the second end 206 of the housing 202 towards the circumferential ribs 302, 304, 306, 308, 502, thus directing the gripping tool over a strengthened region of the housing 202.

Also, during clamping of the gripping tool around the housing 202, the tapered configuration of the first longitudinal ribs 310, 312, 314 and the second longitudinal ribs 322, 324, 326, and the circumferential ribs 302, 304, 306, 308, 502 may provide a guide to the service personnel in order to clamp the gripping tool around the strengthened region of the circumferential ribs 302, 304, 306, 308, 502. Further, the first longitudinal ribs 310, 312, 314 and the second longitudinal ribs 322, 324, 326 may also provide support to the first collar 212 and the second collar 226 respectively, in turn improving an overall rigidity of the housing 202.

While aspects of the present disclosure have been particularly shown and described with reference to the embodiments above, it will be understood by those skilled in the art that various additional embodiments may be contemplated by the modification of the disclosed apparatuses, machines, systems and methods without departing from the spirit and scope of the disclosure. Such embodiments should be understood to fall within the scope of the present disclosure as determined based upon the claims and any equivalents thereof.

What is claimed is:

1. A filter housing comprising:
at least one circumferential rib provided on an outer surface thereof, wherein the at least one circumferential rib includes a plurality of circumferential ribs, each of the plurality of circumferential ribs disposed longitudinally spaced apart with respect to one another;
at least one first longitudinal rib provided on the outer surface thereof, the at least one first longitudinal rib connecting and extending away from the at least one circumferential rib along a length of the filter housing, the at least one first longitudinal rib defining a first thickness thereof, the first thickness tapering towards the at least one circumferential rib; and
at least one second longitudinal rib provided on the outer surface thereof, the at least one second longitudinal rib provided opposing the at least one first longitudinal rib, the at least one second longitudinal rib connecting and extending away from the at least one circumferential rib along the length of the filter housing, the at least one second longitudinal rib defining a second thickness thereof, the second thickness tapering towards the at least one circumferential rib.

2. The filter housing of claim 1 further includes at least one auxiliary rib provided on the outer surface thereof, the at least one auxiliary rib connecting the at least one circumferential rib, the at least one auxiliary rib linearly aligned with respect to the at least one first longitudinal rib and the at least one second longitudinal rib.

3. The filter housing of claim 2, wherein a thickness defined by the at least one auxiliary rib is equal to a thickness defined by the at least one circumferential rib.

4. The filter housing of claim 2, wherein a thickness defined by the at least one auxiliary rib is different with respect to a thickness defined by the at least one circumferential rib.

5. The filter housing of claim 1, wherein the at least one first longitudinal rib includes a plurality of first longitudinal ribs, each of the plurality of first longitudinal ribs disposed radially spaced apart with respect to one another.

6. The filter housing of claim 1, wherein the at least one second longitudinal rib includes a plurality of second longitudinal ribs, each of the plurality of second longitudinal ribs disposed radially spaced apart with respect to one another.

7. The filter housing of claim 1, wherein:
the at least one first longitudinal rib is disposed perpendicular with respect to the at least one circumferential rib, and
the at least one second longitudinal rib is disposed perpendicular with respect to the at least one circumferential rib.

8. The filter housing of claim 1, wherein a first length defined by the at least one first longitudinal rib is different with respect to a second length defined by the at least one second longitudinal rib.

9. The filter housing of claim 1 encloses any one of a fuel filter, an oil filter, a water filter, a coolant filter, and an air filter.

10. A filter housing comprising:
at least one circumferential rib provided on an outer surface thereof;
at least one first sloping element provided on the outer surface thereof, the at least one first sloping element connecting and extending away from the at least one circumferential rib along a length of the filter housing, the at least one first sloping element defining a first slope thereof, the first slope tapering towards the at least one circumferential rib;

at least one second sloping element provided on the outer surface thereof, the at least one second sloping element provided opposing the at least one first sloping element, the at least one second sloping element connecting and extending away from the at least one circumferential rib along the length of the filter housing, the at least one second sloping element defining a second slope thereof, the second slope tapering towards the at least one circumferential rib; and at least one auxiliary rib provided on the outer surface thereof, the at least one auxiliary rib connecting the at least one circumferential rib, wherein a thickness defined by the at least one auxiliary rib is different with respect to a thickness defined by the at least one circumferential rib.

11. The filter housing of claim 10, wherein the at least one circumferential rib includes a plurality of circumferential ribs, each of the plurality of circumferential ribs disposed longitudinally spaced apart with respect to one another.

12. The filter housing of claim 10, wherein a thickness defined by the at least one auxiliary rib is equal to a thickness defined by the at least one circumferential rib.

13. The filter housing of claim 10, wherein the first slope defined by the at least one first sloping element is different with respect to the second slope defined by the at least one second sloping element.

14. The filter housing of claim 10 encloses any one of a fuel filter, an oil filter, a water filter, a coolant filter, and an air filter.

15. A filter housing comprising:
a circumferential rib provided on an outer surface thereof;
a first longitudinal rib provided on the outer surface thereof, the first longitudinal rib connecting and extending away from the circumferential rib along a length of the filter housing, the first longitudinal rib defining a first thickness thereof, the first thickness tapering towards the circumferential rib; and
a second longitudinal rib provided on the outer surface thereof, the second longitudinal rib provided opposing the first longitudinal rib, the second longitudinal rib connecting and extending away from the circumferential rib along the length of the filter housing, the second longitudinal rib defining a second thickness thereof, the second thickness tapering towards the circumferential rib, wherein each of the first longitudinal rib and the second longitudinal rib is adapted to contact and urge a gripping tool towards the circumferential rib; and
a drain port fluidly coupled to the filter housing.

16. The filter housing of claim 15 further includes an inlet port and an outlet port provided in association therewith.

17. The filter housing of claim 15 encloses any one of a fuel filter, an oil filter, a water filter, a coolant filter, and an air filter.

* * * * *